（12）United States Patent
Hsu

(10) Patent No.: US 10,737,358 B2
(45) Date of Patent: Aug. 11, 2020

(54) SELF-REPAIRING AND SELF-SUSTAINING AUTONOMOUS MACHINES

(75) Inventor: Stephen Hsu, Germantown, MD (US)

(73) Assignee: The George Washington University, Washington, DC (US)

( * ) Notice: Subject to any disclaimer, the term of this patent is extended or adjusted under 35 U.S.C. 154(b) by 35 days.

(21) Appl. No.: 14/000,525

(22) PCT Filed: Feb. 21, 2012

(86) PCT No.: PCT/US2012/025923
§ 371 (c)(1),
(2), (4) Date: Oct. 29, 2013

(87) PCT Pub. No.: WO2012/115953
PCT Pub. Date: Aug. 30, 2012

(65) Prior Publication Data
US 2014/0050844 A1 Feb. 20, 2014

Related U.S. Application Data

(60) Provisional application No. 61/445,510, filed on Feb. 22, 2011.

(51) Int. Cl.
B23P 6/00 (2006.01)
F16C 33/10 (2006.01)
(Continued)

(52) U.S. Cl.
CPC ............. *B23P 6/00* (2013.01); *C10M 125/04* (2013.01); *C10M 171/06* (2013.01);
(Continued)

(58) Field of Classification Search
CPC .................................. B23P 6/00; F16C 33/109
See application file for complete search history.

(56) References Cited

U.S. PATENT DOCUMENTS

| 4,854,162 | A | * | 8/1989 | Yerace | ................. | G01M 13/04 73/114.81 |
| 2007/0154634 | A1 | * | 7/2007 | Renn | ...................... | B82Y 30/00 427/180 |

(Continued)

FOREIGN PATENT DOCUMENTS

| WO | WO 2010077773 A1 * | 7/2010 | .......... C10M 139/04 |
| WO | WO-2010077773 A1 * | 7/2010 | .......... C10M 139/04 |

OTHER PUBLICATIONS

International Search Report dated May 25, 2012 (one (1) page).

*Primary Examiner* — Dah-Wei D. Yuan
*Assistant Examiner* — Nga Leung V Law
(74) *Attorney, Agent, or Firm* — Blank Rome LLP

(57) ABSTRACT

The metallurgical composition of a machine surface may be determined. Based on the composition of the surface layer and its substrate materials, a mixture of pure metal nanoparticles, each coated with a monomolecular organic layer adsorbed on its surface can be mixed with catalysts, reaction initiators, and/or other necessary ingredients for the repair action of the machine surface, depending on the specific machine, operational type, and/or the nature of the damage. The nanoparticles are applied to the machine surface, the organic monolayer wears away from the nanoparticles under shear stresses and the nanoparticles adhere to the machine surface to form a repair layer on the machine surface, thereby providing a repaired surface.

19 Claims, 8 Drawing Sheets

(51) Int. Cl.

| | |
|---|---|
| *C10M 125/04* | (2006.01) |
| *C10M 171/06* | (2006.01) |
| *F16C 33/20* | (2006.01) |
| *F16C 33/14* | (2006.01) |
| *C10N 20/06* | (2006.01) |
| *C10N 30/06* | (2006.01) |

(52) U.S. Cl.
CPC .......... *F16C 33/102* (2013.01); *F16C 33/104* (2013.01); *F16C 33/109* (2013.01); *F16C 33/1045* (2013.01); *F16C 33/14* (2013.01); *F16C 33/201* (2013.01); *F16C 33/208* (2013.01); *C10M 2201/14* (2013.01); *C10N 2020/06* (2013.01); *C10N 2030/06* (2013.01); *F16C 2223/30* (2013.01)

(56) References Cited

U.S. PATENT DOCUMENTS

| | | | |
|---|---|---|---|
| 2008/0312111 A1* | 12/2008 | Malshe | C10M 171/06 508/155 |
| 2009/0042751 A1* | 2/2009 | Narayan | C10M 141/00 508/155 |
| 2009/0218537 A1 | 9/2009 | Soroushian et al. | |

\* cited by examiner

SELF-REPAIRING AND SELF-SUSTAINING AUTONOMOUS MACHINES

This application claims priority to provisional U.S. Patent application 61/445,510, titled "Self Repairing and Self Sustaining Autonomous Machines", filed Feb. 22, 2011, and PCT application PCT/US2012/025923, filed Feb. 21, 2012, the entire disclosure of which is incorporated herein by reference.

BACKGROUND OF THE INVENTION

Throughout human history, people have dreamt of machines and robots that can be self-repairing and self-sustaining. Recent advances in nanomaterials and bio-inspired materials have expanded our knowledge on how nature designs biological materials systems. Self-healing and self-repairing research began to appear in the literature, albeit at its infancy. Most of these concepts involve the use of hollow fibers or micro-capsules or other micro-containers of healing agents and catalysts/initiators buried in polymeric microcapsules. When activated, the healing agents and initiators/catalysts combine to achieve repair of the polymer. Corrosion inhibitors have been stored in this way and have shown effectiveness in laboratory tests in enhancing corrosion resistance. Stored monomers and polymerization initiators have also been shown to initiate cross-linking polymerization to achieve repair of minor damage in polymeric materials. But repairing sliding contacts in machine elements such as gears, bearings, pivots, joints, transmissions, engines, etc., where metals and alloy components in sliding contacts are wearing out has not been explored or attempted.

In the current art of self-healing and self-repairing, the process generally involves several steps, including: 1) detecting signals from damaged elements to activate release of repairing agents; 2) releasing of repairing agents (can be pro-active, such as adding measured amount of repairing agent, or passive, such as exposure to air oxidation to open up the micro-capsules); 3) providing a suitable environment in which repairing action can proceed without hindrance; and 4) when the desired level of repair is reached, terminating the process either when it reaches an equilibrium or through exhaustion of repairing agents. Unlike biological systems, however, there is no natural re-generative process to be used in machine systems.

SUMMARY OF THE INVENTION

This invention relates to self-repairing machine elements under sliding contacts. Surfaces that can be repaired by this process include, but are not limited to, surfaces that may be worn down by frictional contact, such as gears and bearings in machinery, metal surfaces damaged by corrosion, surfaces damaged by erosion or impact, or surfaces in metal systems damaged by other means. Machine elements can be made with many materials, including polymers, composites, ceramics, metal alloys, and coating systems and many of them are in sliding contacts. This invention covers all these materials and systems used in machine elements.

According to an embodiment of this invention, the surface composition of the machine may be analyzed or obtained. Based on the composition makeup of the surface layer and its substrate materials, a mixture of nanoparticles (metals or polymers, or ceramics), each coated with a monomolecular organic layer adsorbed on its surface can be mixed with catalysts, reaction initiators, and/or other reaction environment controllers necessary for the right repair action or reactions to proceed, depending on the specific machine, operational type, and/or the nature of the damage.

For nanoparticles, the adhesive strength of the organic monolayer bond with the metal surface can be measured, as shown in FIG. 5, for example, and adjusted (e.g., by varying the alkyl chain length, functional terminal groups, the degree of branching, and the introduction of cross-linking among the chains). In particular, the shear rupture strength of the organic monolayer film is tailored to the varying levels of shear stresses existing in specific sliding contacts so that the particles with bonding strength less than the average shear stresses will lose their organic film and be exposed to the wearing nascent surface and initiate repair action aided by other ingredients such as oxidation reduction catalysts, oxidation promoters, and other alloying elements. Tribochemical reactions will help these raw materials to react and merge with wearing surfaces to initiate bonding of adding materials to the worn surface. The new surface layer will have to be harder than, or at least comparable to, the substrate of the wearing surface to prevent the new surface layers from being removed by wear or shearing actions to ensure the effectiveness of the self-repair.

The present invention may alter the way machines and systems are designed and built, contribute to new manufacturing industries, and conserve valuable mineral resources for future use by extending the lifespan of those machines and systems. For large systems that are difficult to maintain, such as wind turbines located in remote areas or offshore, for example, availability of such self-repairing system may change the economics of wind energy. The present invention may also decrease the number of premature failures and associated safety issues in machinery.

DETAILED DESCRIPTION OF THE INVENTION

Figure 1A:
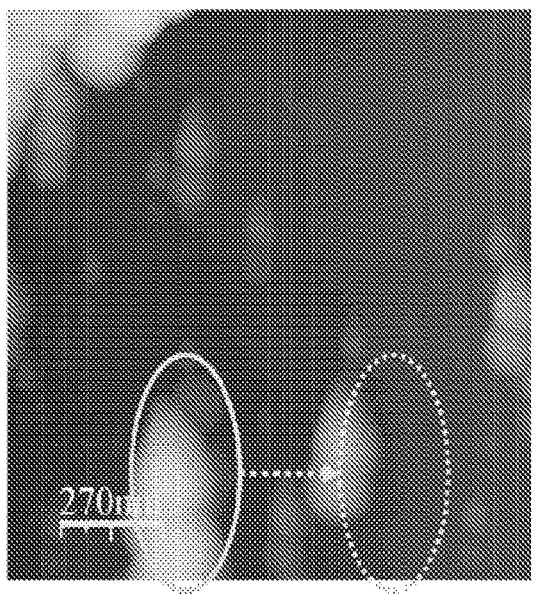
FIGS. 1(a) and 1(b) illustrate Atomic Force Microscopy (AFM) manipulation of a Silica nanoparticle.

In accordance with this invention, machines and machine surfaces can first be analyzed based on usage and contact conditions to determine where wear and damage might occur. Thin-film sensors or other small sensors can be placed in strategic locations on or near the machine and signals can be transmitted through a radio signal transmitter. In some cases, such signals are routed through satellites to a remote control center, such as the GE wind turbines condition monitoring service. Existing monitoring systems can detect malfunctions and damage but cannot do anything to initiate repair. The present invention provides for the dispensing of stored repairing agents into the lubricating oil of a machine and initiates repair when repairing agents enter a damaged contact zone. Since the amount of repairing agent inserted into the lubricating oil is predetermined, excess reaction is minimized.

According to one embodiment of this invention, nanoparticles coated with an organic monolayer are applied to surfaces of a machine. The bonding strength of the organic-metal nanoparticle is measured and adjusted to tailor to the shear stresses existing in the contact. Under such conditions, the organic layer will be sheared off, exposing the metal nanoparticles to be adsorbed or absorbed on the rubbing machine surface. The contact temperatures (flash temperatures), shearing actions, combined in so called tribochemical reaction paths will act on the nanoparticles to form a new surface layer on the machine surface. In accordance with an exemplary embodiment of the present invention, the nanoparticles may be encapsulated in polymeric pouches and applied to the machine surface when the polymeric pouches are ruptured by wear on the machine surface. Further, the machine surface may have dimples, which may have varying depths, and the polymeric pouches may be placed inside the dimples.

Additional controls of the reaction are provided by other ingredients contained in a repair agent package to guide the reactions to form a surface layer that will not be worn away. The "catalysts" in the repairing agent package may be oxidation promoters, oxidation reduction agents, other metal particles that serve as catalysts, alloying elements, etc., depending on the specific material system, surface compositions, and the operating conditions of the machinery. The "catalysts" and conditioners assist the metal nanoparticles in reacting with the machinery surface during the operating conditions, forming a new "repaired" layer on the machinery surface.

The choice of metal nanoparticles depends on the surface composition, metal phase diagrams, potential to form eutectic alloys, and, under certain conditions, to form layers harder than the substrate material to affect repair. Also, the nanoparticle material must be compatible with the material that makes up the surface of the machine in order to form the repair layer. The size and purity of the nanoparticles are also critical parameters. If an oxide layer is present on a nanoparticle, because of the nanoparticle size, the percentage of the oxide to the net pure metal is very high, which will influence the particle properties, affecting the particle's adhesion and surface energy.

When the size of a particle shrinks, the surface forces rise exponentially. To prevent aggregation of nanoparticles, they have to be coated with a monolayer of organic molecules, which acts as a repulsive layer to keep the nanoparticles from aggregating. The organic monolayer can be made of a variety of materials, as long as it is compatible with the material making up the nanoparticles. When the bonding strength of the organic molecules is controlled and the organic film ruptures inside a sliding contact under shear, then the nanoparticles will react/merge/alloy with the surface of the sliding contact, thereby providing repair to that surface.

In a sliding contact, it has been found that short bursts of high temperatures, emitted electrons, and mechanical shearing exist, forming a reactive environment in which some reactions only exist inside a contact (i.e., tribochemistry). Surface layers and interfacial layers are often formed as a result of the combined mechano-chemical actions. Some are beneficial and some are deleterious to wear. Initial experiments involving the injection of coated nanoparticles of silver and copper into a contact found a tendency to stick to the surface after wear.

Figure 1B:
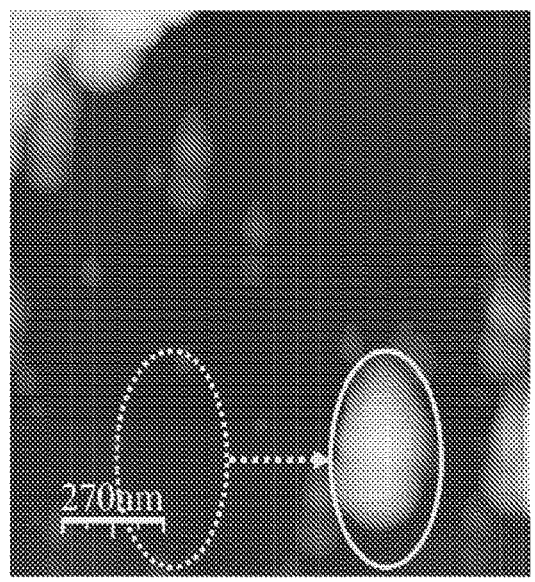

In the development of the present invention, particle-particle interaction studies have been conducted in a clean environment using Atomic Force Microscopy ("AFM"). FIGS. 1(a) and 1(b), for example, illustrate one nanoparticle being ushered from one location to another. Specifically, FIGS. 1(a) and 1(b) show the AFM manipulation of a Silica nanoparticle with a 40 nm diameter that has been performed. Experiments were also conducted in which a groove was created using a sharp diamond tip on a silicon wafer and dip coated particle A on one side and particle B on the other side. Then using an AFM tip, particle A was moved toward particle B to observe the interparticle interaction patterns. Under heating, some particles fused together forming a new particle. However, the oxide layer and contaminations interfered with the experiment.

Figure 2A:
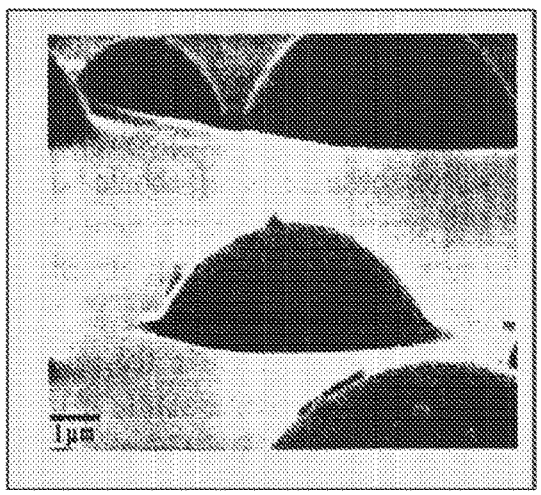
FIGS. 2(a) and 2(b) illustrate surface deformation of small particles.
Figure 2B:
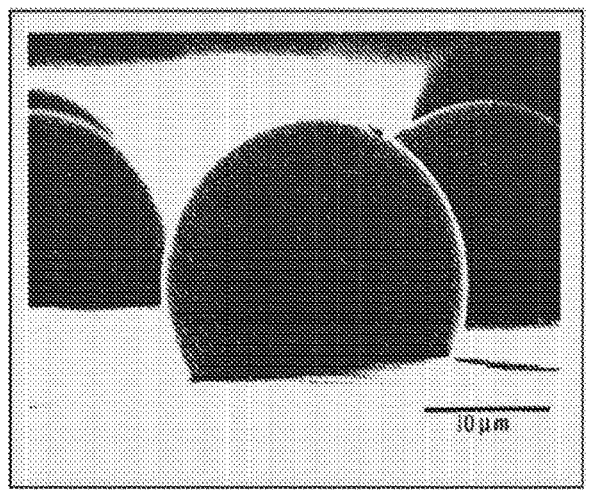

It has also been observed that with a size-dependent mechanical property below a critical particle size, the moduli decrease as a function of size. When the particle size is sufficiently small, the surface tension force may become a factor as shown in FIGS. 2(a) and 2(b). In particular, for small particles, the strains can be large, resulting in yielding and deformation. For example, surface contact of the two surfaces generates stresses within the contact and plastic deformation often occurs. As shown in FIGS. 2(a) and 2(b), which show 4 nm and 11 nm radius glass particles on plasticized polystyrene, the particle tends to submerge into the surface.

The use of selected metal nanoparticles as antiwear additives and self-repairing agents is described below.

Metal nanoparticles can be used as an antiwear agent. These solid particles can act as nanobearings or provide an easily-shearable soft layer to the bearing surface to reduce friction. Nanoparticles of this type can be solubilized by an organic coating that is oil soluble and therefore, exist as natural colloidal suspension in oil to provide lubrication. Nanoparticles of ceramics may be used to function as nanobearings under certain conditions. Nanoparticles of soft metals such as silver, gold, copper, and tin can be used as lubricant additives to enhance antiwear actions. Solid phase repair function: Shear rupture releases particles for adhesion. The particles react with the substrate according to phase diagram and equilibrium concentration levels under frictional heating. Melting or reacting is performed to form the desired alloy phase. Surface forces are used to combine particles and the substrate, as particle size shrinks to optimum size where the number of atoms on the surface equals the number of atoms inside the core, forming non-equilibrium alloys.

The use of nanoparticles as repairing agents in accordance with the present invention is further described below. Using transition metals particles provides a rapid way to attach molecules to the particle surface uniformly to induce solubility. Strong adhesion of the molecular film to the particle prevents adhesion to the substrate, therefore lubricating as nanobearings. However, if the nature of the attaching molecules is changed, such that the particle can still lubricate under normal temperature and stress intensity but will shear rupture under a critical temperature and shear stress, direct contact of the particle with the substrate will take place. If the particle is small enough, the surface force is large enough to provide sufficient energy for the particle to adhere or merge with the surface to form a new surface layer. And if the phase relationship is suitable to allow wetting and solubility, a new alloy may be formed.

In one embodiment of the present invention, a commercial application may involve critical moving parts equipped with thin-film sensors to monitor vibration signatures, temperatures, and friction forces. The data from these sensors may be transmitted via radio signals to a control site (e.g., condition-based monitoring as currently practiced in power generation). A mathematic model of the contact system can be constructed to identify potential damage based on anomaly in the signals (based on controlled calibration experiments). When the model determines that a remedial action is needed, a signal will be automatically sent to inject a measured dose of nanoparticles from a reservoir into the fluid passing through the contact to effect repair of the contact surface.

Figure 3:
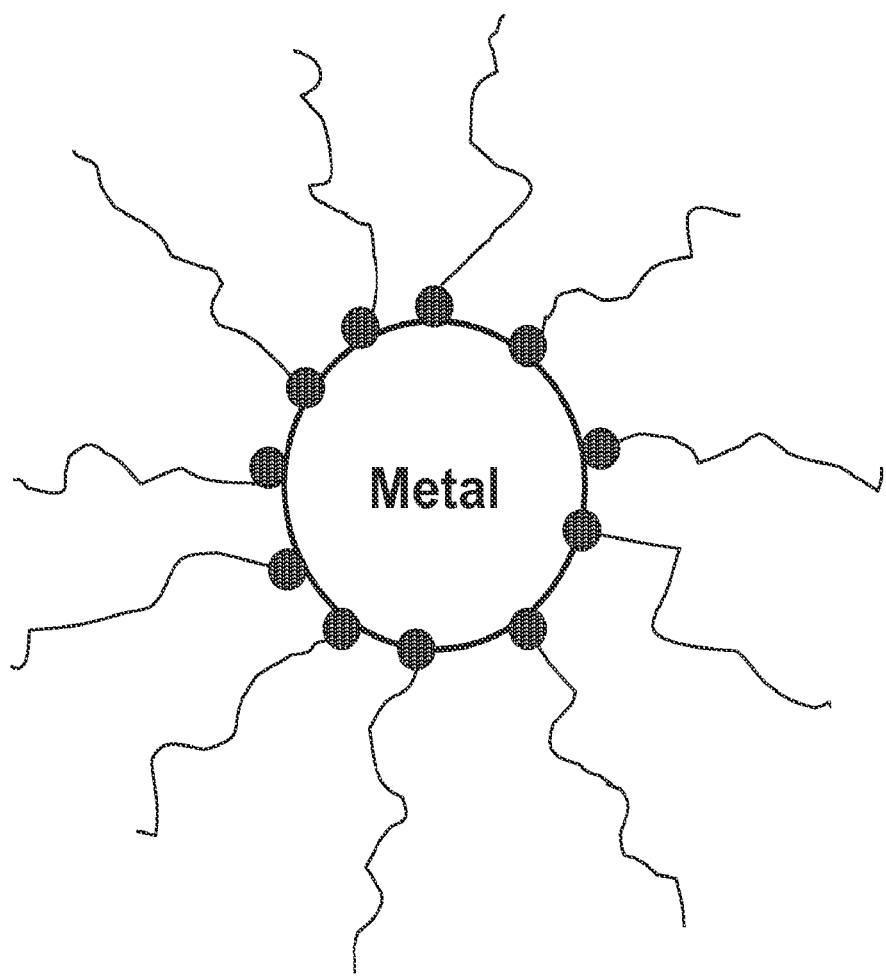
FIG. 3 illustrates an exemplary design for antiwear and self-repairing particle coating.

FIG. 3 depicts an exemplary design for antiwear and self-repairing particle coating. In particular, FIG. 3 also shows the use of a metal nanoparticle with controlled bonding strength of organic molecules bonded around the nanoparticle.

Figure 4A:
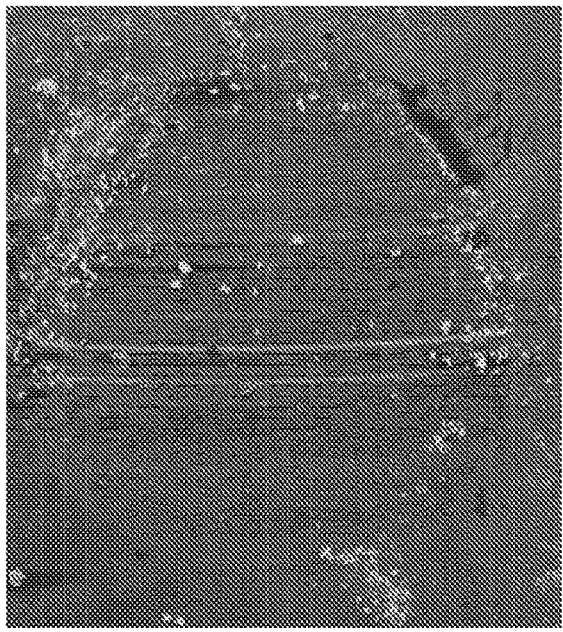
FIGS. 4(a) and 4(b) illustrate the formation of a nanoparticle metal film on a wear contact.
Figure 4B:
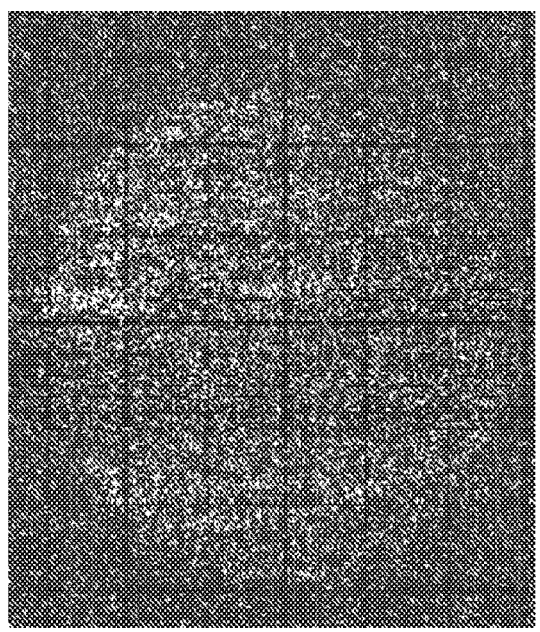

FIGS. 4(a) and 4(b) illustrate the formation of a nanoparticle metal film on a wear contact in accordance with the present invention. Under rubbing conditions of the wear contact, the organic layer can be sheared off, exposing the nanoparticles of metal against the nascent rubbing surface forming a mechanochemical bond and replenishing the surface layer under wear.

Figure 5:
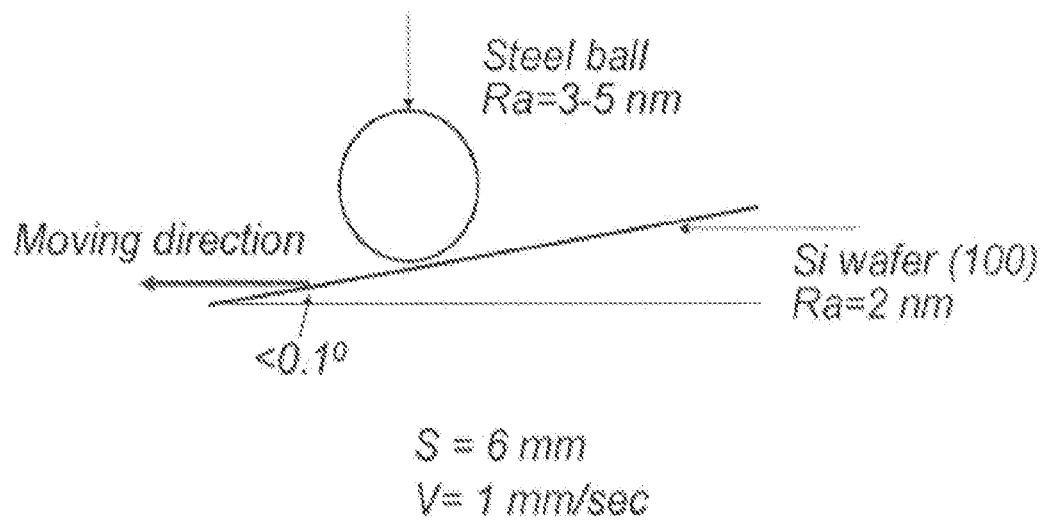
FIG. 5 illustrates the mechanical testing performed on the nanoparticle metal film of an embodiment of the present invention for film rupture strength measurement.
Figure 6:
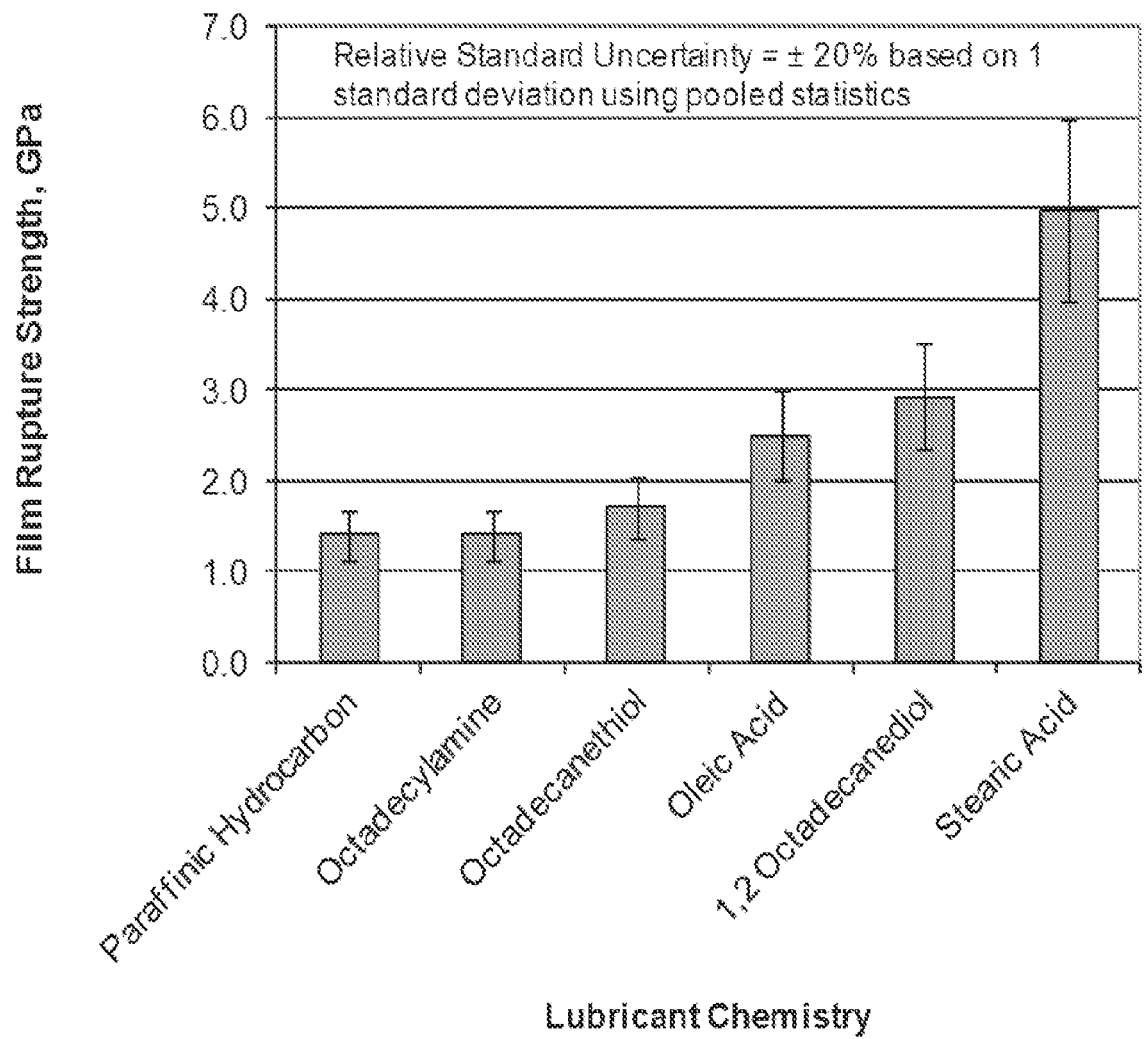
FIG. 6 contains a chart showing film strength at 1 nm on various films on silicon.
Figure 7:
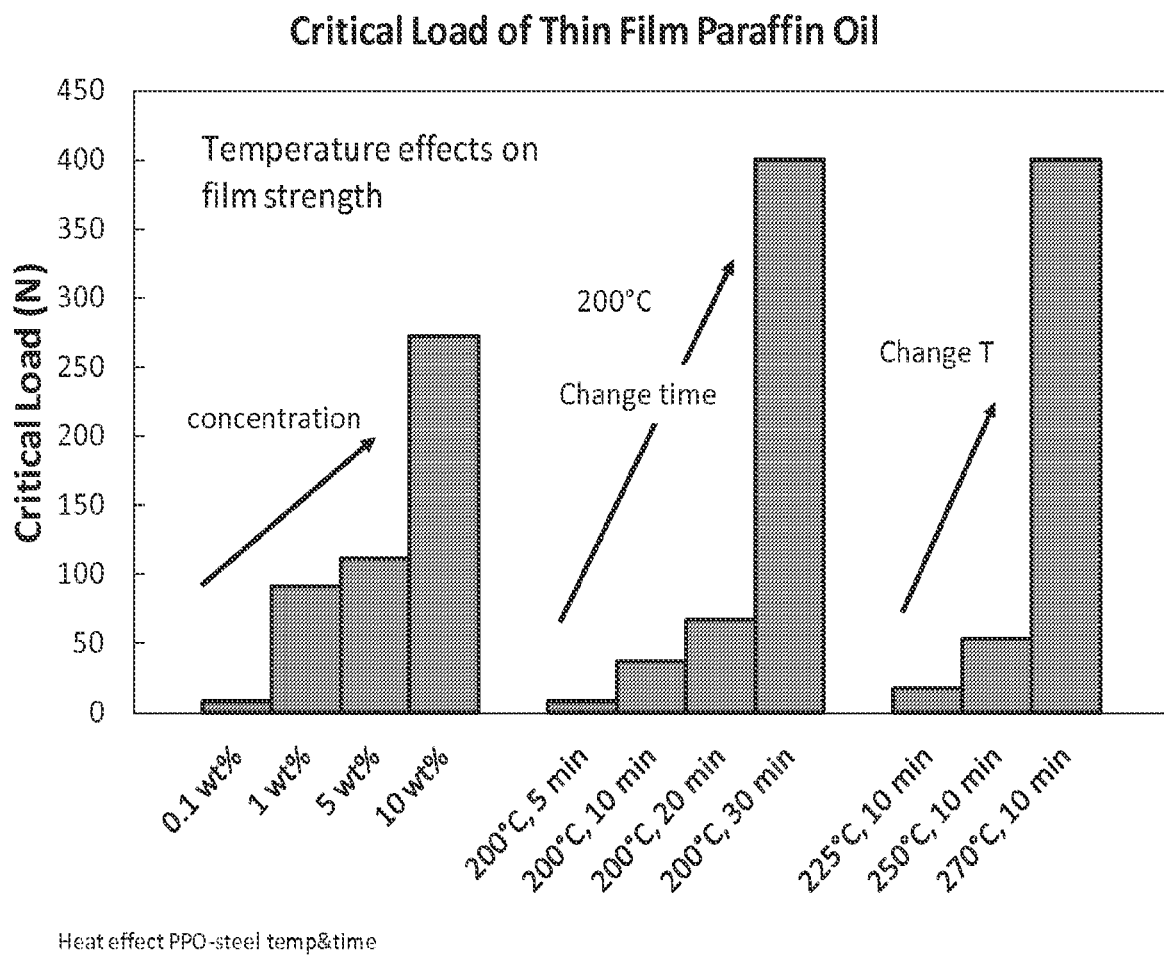
FIG. 7 contains a chart showing temperature effects on film rupture strength of thin-film paraffin oil.
Figure 8:
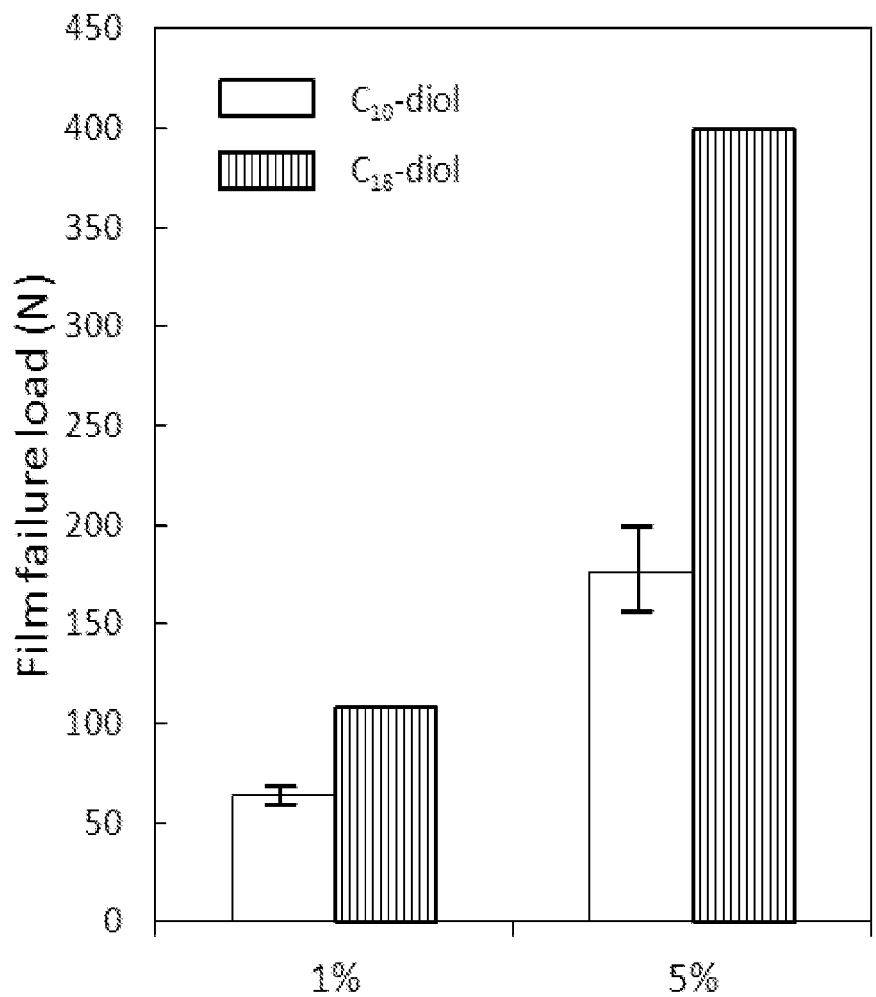
FIG. 8 contains a chart showing chain length effect on film failure load.

FIGS. 5-8 depict mechanical tests performed on nanometer thick films on surfaces contemplated by the present invention. In particular, FIG. 5 illustrates mechanical testing performed on a nanoparticle metal film of an embodiment of the present invention. FIG. 6 illustrates a chart showing film strength of various 1 nm films on an iron surface deposited on a silicon wafer. FIG. 7 illustrates a chart showing temperature effects on film rupture strength of thin-film paraffin oil, including changes in concentration, time and temperature. As shown in this figure, the film strength increases as the concentration increases, as the length of time at 200° C. increases, and as the temperature increases. FIG. 8 illustrates a chart showing chain length effect on film failure load for a steel substrate. As shown in the figure, as the chain length increases, the film strength increases.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of repairing a machine surface, comprising:
    applying a plurality of coated nanoparticles to a machine surface, each coated nanoparticle comprising a nanoparticle having an organic monolayer coated thereon;
    applying a sheer stress sufficient to remove the organic monolayer from the coated nanoparticles to result in the formation of a plurality of uncoated nanoparticles; and
    tribochemically reacting at least some of the plurality of uncoated nanoparticles with the machine surface to form a repaired surface including a repair layer.

2. The method of repairing a machine surface according to claim 1, wherein the coated nanoparticles are encapsulated in polymeric pouches and the coated nanoparticles are applied to the machine surface when the polymeric pouches are ruptured by wear on the machine surface.

3. The method of repairing a machine surface according to claim 2, wherein the machine surface has surface textures including dimples of varying depths and the polymeric pouches are placed inside the dimples.

4. The method of repairing a machine surface according to claim 1, wherein a repair agent package including at least one of catalysts, oxidation promoters, and oxidation reduction agents is used to control the tribochemical reactions to guide nanoparticle-surface reactions to create and build up the repair layer.

5. The method of repairing a machine surface according to claim 1, wherein the coated nanoparticles are applied to the machine surface via a lubricating fluid.

6. The method of repairing a machine surface according to claim 5, wherein repair of the machine surface is initiated when the uncoated nanoparticles enter a damaged area of the machine surface.

7. The method of repairing a machine surface according to claim 5, wherein a predetermined amount of the coated nanoparticles is injected from a reservoir into the lubricating fluid.

8. The method of repairing a machine surface according to claim 1, wherein the repair layer is harder than a substrate material of the machine surface.

9. The method of repairing a machine surface according to claim 1, wherein the repair layer includes an alloy formed by the tribochemical reaction.

10. The method of repairing a machine surface according to claim 1, further comprising:
    monitoring sensors to obtain sensor data of at least one of vibration signatures, temperatures, and friction forces of the machine surface;
    identifying potential damage to the machine surface based on the sensor data; and
    initiating the step of applying the coated nanoparticles to the machine surface when potential damage to the machine surface is identified.

11. The method of repairing a machine surface according to claim 10, wherein the coated nanoparticles are encapsulated in polymeric pouches and the coated nanoparticles are applied to the machine surface when the polymeric pouches are ruptured by wear on the machine surface.

12. The method of repairing a machine surface according to claim 11, wherein the machine surface has dimples of varying depths and the polymeric pouches are placed inside the dimples.

13. The method of repairing a machine surface according to claim 10, wherein a repair agent package including at least one of catalysts, oxidation promoters, and oxidation reduction agents is used to control the tribochemical reactions to guide nanoparticle surface reactions to build up the repair layer.

14. The method of repairing a machine surface according to claim 10, wherein the coated nanoparticles are applied to the machine surface via a lubricating fluid.

15. The method of repairing a machine surface according to claim 14, wherein repair of the machine surface is initiated when the uncoated nanoparticles enter a damaged area of the machine surface.

16. The method of repairing a machine surface according to claim 14, wherein a predetermined amount of the coated nanoparticles is injected from a reservoir into the lubricating fluid.

17. The method of repairing a machine surface according to claim 10, wherein the repair layer is harder than a substrate material of the machine surface.

18. The method of repairing a machine surface according to claim 10, wherein the repair layer includes an alloy formed by the tribochemical reaction.

19. The method of repairing a machine surface according to claim 1, wherein each uncoated nanoparticle is selected from the group consisting of metal nanoparticles, polymeric nanoparticles and ceramic nanoparticles.

\* \* \* \* \*